United States Patent
Howes et al.

(10) Patent No.: US 9,697,003 B2
(45) Date of Patent: Jul. 4, 2017

(54) METHOD AND SYSTEM FOR YIELD OPERATION SUPPORTING THREAD-LIKE BEHAVIOR

(71) Applicant: Advanced Micro Devices, Inc., Sunnyvale, CA (US)

(72) Inventors: Lee W. Howes, Austin, TX (US); Benedict R. Gaster, Santa Cruz, CA (US); Michael C. Houston, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 462 days.

(21) Appl. No.: 13/912,963

(22) Filed: Jun. 7, 2013

(65) Prior Publication Data
US 2014/0365752 A1    Dec. 11, 2014

(51) Int. Cl.
| G06F 9/42 | (2006.01) |
| G06F 9/38 | (2006.01) |
| G06F 9/30 | (2006.01) |
| G06F 9/45 | (2006.01) |

(52) U.S. Cl.
CPC .......... *G06F 9/3851* (2013.01); *G06F 8/458* (2013.01); *G06F 9/3009* (2013.01)

(58) Field of Classification Search
None
See application file for complete search history.

(56) References Cited

U.S. PATENT DOCUMENTS

| 7,353,369 B1 * | 4/2008 | Coon ................. G06F 9/30101 712/220 |
| 7,493,615 B2 * | 2/2009 | Gewirtz ................. G06F 8/458 712/234 |
| 8,607,247 B2 | 12/2013 | Howes et al. |
| 9,424,099 B2 | 8/2016 | Houston et al. |

* cited by examiner

*Primary Examiner* — Cheng-Yuan Tseng
(74) *Attorney, Agent, or Firm* — Volpe and Koenig, P.C.

(57) ABSTRACT

A method, system, and computer program product synchronize a group of workitems executing an instruction stream on a processor. The processor is yielded by a first workitem responsive to a synchronization instruction in the instruction stream. A first one of a plurality of program counters is updated to point to a next instruction following the synchronization instruction in the instruction stream to be executed by the first workitem. A second workitem is run on the processor after the yielding.

17 Claims, 5 Drawing Sheets

```
int s_test;
int v_pc[];      // PC storage vector int find_lowest_runnable_PC(int ref_PC)
{
        s_test = MAX_INT;

for(i=0; i<WAVE_SIZE; i++)
        {
                if(v_pc[i] >ref_PC && v_pc[i] < s_test)
                {
                                s_test = v_pc[i];
                }
        }
        return s_test;
} void reschedule()
{
        int s_jumpPC = 0;
        while( s_jumpPC != MAX_INT)
        {
                s_jumpPC = find_lowest_runnable_PC(s_jumpPC);
                if(s_jumpPC != MAX_INT)
                {
                        mask = s_jumpPC & v_pc;
                        setmask(mask);
                        jump s_jumpPC;
                }
                else
                {
                        sleep();
                }
        }
}
```

FIG. 2

METHOD AND SYSTEM FOR YIELD OPERATION SUPPORTING THREAD-LIKE BEHAVIOR

BACKGROUND

Field of the Invention

The present invention relates generally to workitem synchronization.

Background Art

Graphics processing units (GPU) generally comprise multiple processing elements that are ideally suited for executing the same instruction on parallel data streams, as in the case of a single instruction multiple data (SIMD) device or in data-parallel processing. In many computing models a central processing unit (CPU) functions as the host or controlling processor and hands-off specialized functions, such as graphics processing, to other processors such as GPUs.

Multi-core CPUs, where each CPU has multiple processing cores, offer processing capabilities for specialized functions (e.g., graphics processing) similar to those available on a GPU. One or more of the computation cores of multi-core CPUs or GPUs can be part of the same die (e.g., AMD Fusion™) or, alternatively, in different dies (e.g., Intel Xeon™ with NVIDIA GPU). Recently, hybrid cores having characteristics of both CPU and GPU (e.g., AMD Accelerated Processing Units (APUs), CellSPE™, Intel Larrabee™) have been proposed for general purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets.

Several frameworks have been developed for heterogeneous computing platforms that have CPUs and GPUs. These frameworks include BrookGPU by Stanford University, the compute unified device architecture (CUDA) by NVIDIA, and OpenCL by an industry consortium named Khronos Group. The OpenCL framework offers a C-like development environment which users can create applications for the GPU. OpenCL enables the user, for example, to specify instructions for offloading some computations, such as data-parallel computations, to a GPU. OpenCL also provides a compiler and a runtime environment in which code can be compiled and executed within a heterogeneous computing system.

The computing model embodied by OpenCL, CUDA and many low level GPU intermediate languages is sometimes referred to as a single instruction multiple thread ("SIMT") processing or single process multiple data on SIMD ("SPMD-on-SIMD"). In a frequently used implementation of the SIMT model, SIMD execution using hardware mask sets on vectors is used to simulate threading to a finer grain than what is available in the hardware. In the SIMT model, what is presented as threads to the user are implemented using SIMD vectors. A "SIMD vector", as used herein, refers to a set of workitems executed on a processor or processing element that is capable of SIMD execution. More specifically, each lane of a SIMD vector is presented to the user as a separate thread. However, the entire SIMD vector can execute only one instruction at a time. Therefore, if two of the simulated threads corresponding to two lanes in a SIMD vector have diverging control flow instructions, only one of these control flow paths can be executed by the hardware at a time.

In order to efficiently utilize computing models where the CPU and the GPU can both be used for the execution of many types of code, more flexible thread synchronization models are needed. The conventional workitem synchronization available in OpenCL, for example, may be less efficient when used with workitems that are not traditional graphics processing tasks. For example, whereas respective concurrent workitems in a graphics processing task may not often synchronize after diverging, in CPU associated applications, synchronization may be relatively higher. The synchronization model provided in OpenCL, by itself, is inadequate to handle such dynamic behavior of workitems.

In OpenCL, workitems within a workgroup can be synchronized. Within a workgroup, a barrier instruction can be issued with the semantics that all workitems in the workgroup must reach the barrier before any can proceed past the barrier. A "barrier" blocks all processes that reach it until the semantics noted above is satisfied. It then releases the blocked processes to resume their respective processing. However, in OpenCL and other similar conventional frameworks, barrier use in control flow is heavily restricted. In particular, when the control flow diverges between workitems of the same workgroup, synchronization between the workitems may fail. Moreover, when barriers are used, each workitem that is blocked at the barrier impose processing overhead because they are generally implemented as active spin locks.

Thus restrictions associated with many of the current synchronization techniques limit the ability of the system and the programmer to optimally utilize processing resources.

SUMMARY OF EMBODIMENTS

Methods, systems and computer readable storage mediums for more efficient and flexible scheduling of workitems on a processor are disclosed. Techniques are disclosed for synchronizing by providing explicit synchronization instructions in portions of the instruction stream where divergent control flow occurs. The disclosed techniques provide for workitems in one branch of the control flow to synchronize with workitems in another branch without requiring either of the workitems to actively wait on an executed instruction, such as a barrier instruction. The disclosed techniques can be used in processor architectures such as, but not limited to, vector processors, SIMD processors, and processors including scalar and vector units. The disclosed techniques yield substantial improvements in improved processing efficiency and flexibility in programming. In particular, the disclosed technique allows the execution of multiple instruction multiple data (MIMD) style applications on SIMD processors.

The disclosed method, system, and computer program product embodiments for synchronizing a group of workitems executing an instruction stream on a processor, include yielding the processor by a first workitem responsive to a synchronization instruction in the instruction stream, updating a first one of a plurality of program counters to point to a next instruction following the synchronization instruction in the instruction stream to be executed by the first workitem, and running a second workitem on the processor after the yielding.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings:

FIG. 2 illustrates a rescheduling (in pseudo code) for workitems, according to an embodiment of the present invention.

DETAILED DESCRIPTION OF EMBODIMENTS OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using one or more processors. The present invention may be particularly useful where the system comprises a heterogeneous computing system. A "heterogeneous computing system," as the term is used herein, is a computing system in which multiple kinds of processors are available.

In a GPU, workitems assigned to a processing element are referred to as a "workgroup". Two or more workitems that are issued for execution in parallel in a compute unit is a "wavefront". A workgroup may comprise one or more wavefronts. Other terms for wavefront may include "warp" and "vector." Although embodiments are primarily described in relation to synchronizing workitems of a workgroup, the teachings of this disclosure may be applied to synchronize workitems across any one or more processors and/or groups of processes that have access to a shared memory. The term "kernel", as used herein, refers to a program and/or processing logic that is executed as one or more workitems in parallel having the same code base. It should be noted that, in some embodiments, the terms "workitem" and "thread" are interchangeable. The interchangeability, in this disclosure, of "workitem" and "thread" is illustrative, for example, of the flexible simulated or true independence of workitem execution embodied in the model in embodiments.

In certain embodiments of the present invention, the embodiments can significantly improve the performance of systems by enabling more efficient and more flexible synchronization between concurrent workitems. In a GPU, multi-core CPU, or other processor that executes a very large number of concurrent workitems (for example, using a SIMD or SIMT framework), the embodiments can improve efficiency by enabling workitems having divergent control flows to synchronize. The ability to synchronize over divergent control flows enables the execution of MIMD style programming on SIMD environments. Embodiments are particularly useful when mapping a SIMT framework onto a SIMD/vector processor.

Figure 1:
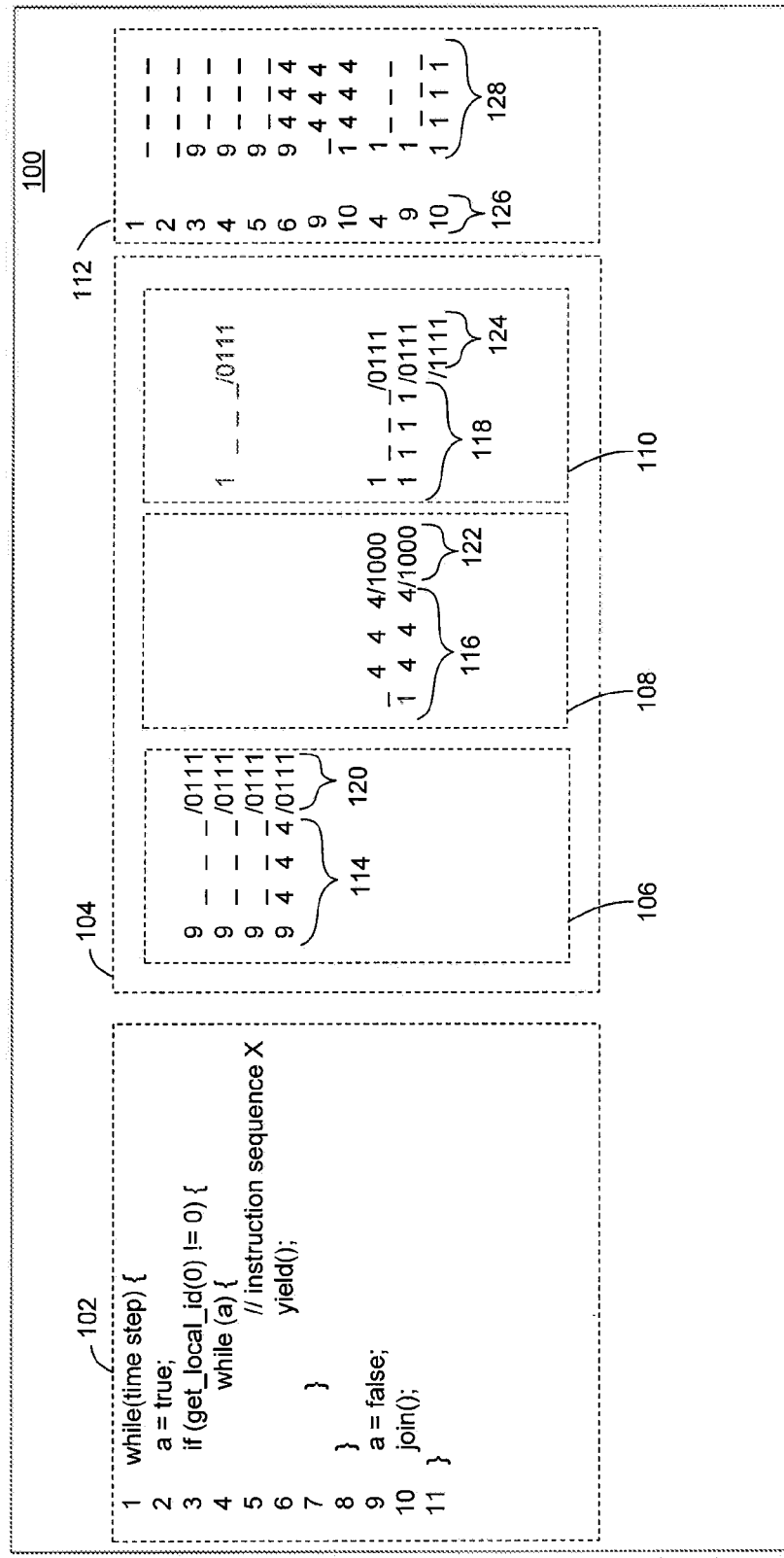
FIG. 1 illustrates an exemplary program in pseudo code and aspects of the execution environment of the program in accordance with an embodiment of the present invention.

For example, if the control flow of a thread executed by a SIMD vector diverges, such that all except one workitem of the workitems corresponding to that thread are waiting for a particular value to be updated by the one workitem that is not in the loop, many conventional techniques may lack the flexibility to provide adequate synchronization. Embodiments disclosed herein, for example, as shown in FIG. 1, provide for efficient synchronization Synchronization across divergent control flows is achieved in embodiments of the present invention by inserting synchronization points in the instruction stream that provide for the one or more currently executing workitems to wait and for selecting another process to run. However, in contrast to barrier-based synchronization, the disclosed embodiments do not require that workitems actively wait (e.g., such as by implementing a spin lock) on an instruction which has already been reached by the workitems. The program counters of the respective workitems are kept track of upon encountering, divergent control flow, and particularly upon providing for a workitem to wait (e.g., upon a workitem yielding the processor so that another workitem may run on the processor). The workitem to run next on the processor may be selected based upon the relative values of the program counters. Additionally, a convergence point in the instruction stream may be used to ensure that all workitems, including those that encounter particular synchronization points, converge at selected points in the instuction stream.

By enabling workitems to be synchronized across divergent control flows, various performance improvements and increased programming flexibility can be achieved.

The short exemplary program portion illustrated in FIG. 1 is illustrative of some of the flexibility yielded by embodiments of the present invention. Embodiments disclosed herein, by themselves, and in combination with barrier techniques disclosed in U.S. patent application Ser. No. 13/288,833 filed on Nov. 3, 2011, and U.S. patent application Ser. No. 13/672,291 filed on Nov. 8, 2012, both of which are incorporated by reference herein in their entireties, can yield improvements in processing speed as well as in power efficiency due to more efficient and flexible synchronization among workitems.

FIG. 1 illustrates an exemplary program part 102 in pseudo code and aspects of the execution environment of the program part in accordance with an embodiment of the present invention. Program part 102 illustrates an example divergent control flow through the use of a "while(a)" loop which is executed based upon a conditional value. The control flow may diverge between respective workitems of a SIMD vector thread executing the code, with some of the workitems entering the while(a) loop and waiting until a conditional value (e.g., variable "a") is updated by another workitem which may not enter the while(a) loop. The instruction sequence 102 includes a synchronization instruction (e.g., the "yield( )" instruction in 102). Outside of the conditional loop, a convergence instruction (e.g., the "join( )" instruction in 102) acts to ensure that all workitems are synchronized at the same program counter before any are allowed to proceed beyond the convergence point. The leftmost column in 102 represents the line number which can be considered as the respective value of the program counter associated with the corresponding instruction of 102 (e.g., 6 is the value of the program counter associated with the yield( ) instruction).

Item 104 illustrates the flow of program part 102 when executed by a SIMD vector having four workitems, and how the stored program counter vector associated with each of the four workitems and the mask associated with the SIMD vector change during execution of program part 102. The three columns 106, 108 and 110 shown in item 104 represent the instruction execution as the control flow changes during execution of program part 102 by the SIMD vector. Items 114, 116 and 118 show the changes in the stored program counter vector, and items 120, 122 and 124 show the corresponding changes in the mask of the SIMD vector. The stored program counter vector is illustrated as a sequence of four numbers, each number indicating the next instruction to be executed by the corresponding workitem. For example, the stored program counter vector "a b c d" represents stored program counter values a, b, c and d, respectively, for workitems 0, 1, 2 and 3 of the SIMD vector. The mask is illustrated as a bit vector or bit mask having a width of 4 bits. A bit position in the mask is set to on (i.e., set equal to 1) if the corresponding workitem is enabled to run (e.g., executable) and is set to off (i.e., set equal to 0) if the corresponding workitem is not enabled to run (e.g., not executable).

Item 112 illustrates the executed program counter and the vector of stored program counters in sequence during execution of program part 102, according to an embodiment. According to an embodiment, separate program counters are maintained for respective workitems of a SIMD vector upon encountering diverging control flow. When not in a divergent control flow, one program counter can be maintained in common for the all the respective workitems of the SIMD vector. In item 112, the left column (item 126) illustrates the executed program counter, and the right column (item 128) illustrates the stored program counters of the respective workitems as the SIMD vector executes.

According to an embodiment, until instruction execution encounters the "if (get_local_id(0))" conditional at line 3 (shown in program part 102), no values are stored in the stored program counter vector, as shown in the first two rows of item 112. After executing the instruction at line 3, the workitems diverge. Specifically, workitem 0 (e.g., workitem with a local id of 0) does not enter the if condition section (lines 4-8) whereas workitems 1-3 do enter. Such following of different execution paths by separate instances (e.g., workitems) of a program is referred to as "divergent control flow." Thus, according to an embodiment, the program counter of the next instruction (e.g., line 9 of program part 102) to be executed in the branch not taken (e.g., worksitem 0) is stored in the stored program counter vector. The mask is set to '0111' to indicate that workitems 1-3 enter the if conditional processing, and workitem 0 does not. The stored program counter vector and the mask, as they are upon the SIMD vector executing line 3 of program part 102, are shown as the top row in 106. The third row of item 112 illustrates the corresponding executed program counter (3) and the stored program counter vector "9 _ _ _".

After executing line 3 of program part 102, workitems 1-3 proceed to enter the if condition section and execute line 4. Because the SIMD vector can execute only one path of the divergent flow at a time, workitem 0 waits. At line 4, workitems 1-3 enter a "while (a)" loop. The variable "a" is set to TRUE at line 2. Workitems 1-3, which enter the while loop, execute line 5. During the execution of lines 4-5 by workitems 1-3 the stored program counter vector and the mask may not change. This is illustrated in items 106 and also in item 112.

At line 6 of program part 102, workitems 1-3 execute the "yield( )" instruction. The yield( ) instruction, according to an embodiment, causes the program counters of the currently executing workitems to be written to the stored program counter vector and the selection of a waiting workitem for execution. Accordingly, at line 6, the stored program counter vector is updated to "9 4 4 4" representing that, in addition to the previously stored next instruction of workitem 0, the newly determined next instruction for workitems 1-3 is at line 4 (i.e., the top of the while(a) loop). The updated stored program counter vector is shown as the last row of item 114, and is also shown in item 112.

Thus, upon executing the yield( )instruction, workitems 1-3 in effect yield the processor to the waiting workitem 0. Workitem 0 restarts execution from line 9 of program part 102 based upon its stored program counter. In accordance with an embodiment, the stored program counter vector may be updated to "_ 4 4 4" to represent that the workitem 0 is no longer waiting to execute a particular instruction. The mask may be set to "1000" indicating that workitem 0 is enabled to run whereas workitems 1-3 are not enabled to run. Workitem 0 executes instructions 9 and 10, as shown in item 108, and also in the rows corresponding to program counters 9 and 10 in item 112. At line 9, workitem 0 sets variable "a" on which the other workitems 1-3) are waiting to FALSE. At line 10, workitem 0 executes a convergence instruction, the join( ). The join( ) causes the evaluation of the SIMD vector to determine if all the workitems associated with the vector have arrived at the join, and if not to run a workitem that has not yet arrived at the join( ).

Accordingly, when workitem 0 arrives at the join( ), the program counter corresponding to the next instruction to be executed by workitem 0 is stored in the stored program counter vector. Thus, the stored program vector can be represented as "1 4 4 4" indicating that the next instruction for workitem 0 is the top of the outer while loop (i.e., while (time step) loop). After workitem 0 executes the join( ) instruction, the processor is yielded to workitems 1-3, and the mask is set appropriately to "0111".

Workitems 1-3 then execute the next instruction 4 based upon the corresponding stored program counters. According to an embodiment, the stored program counter vector is updated as "1 _ _ _" to indicate that workitems 1-3 are no longer waiting. Because variable "a" was set to FALSE by workitem 0 at instruction 9, now, when executed by workitems 1-3, the while(a) at line 4 evaluates to false, and workitems 1-3 proceed to exit the while(a) loop. Workitems 1-3, upon exiting the while(a) loop, execute instructions at lines 9 and 10. Upon executing the join( ) at line 10, the stored program counter vector may be updated as "1 1 1 1." At this point, all workitems of the SIMD vector thread have converged on the same program counter. Therefore, the mask may be set to "1 1 1 1" to indicate that all workitems are runnable. Moreover, in accordance with an embodiment, the tracking of individual program counters for respective workitems of the SIMD vector may be ceased because the control flow is no longer divergent.

FIG. 2 illustrates a rescheduling (in pseudo code) for workitems, according to an embodiment of the present invention. FIG. 2 illustrates an exemplary reschedule function, and an exemplary find_lowest_runnable_pc function.

The reschedule function includes instructions to schedule one or more workitems for execution. The reschedule function calls the find_lowest_runnable_pc which, as the function name suggests, finds runnable workitems with the minimum valued program counters.

The rescheduling of workitems can be based upon one or more of many characteristics of the program counters associated with the respective workitems. Finding of the one or more workitems with the minimum valued program counters is one of the techniques for selection. Other techniques, such as, finding the mode of the current program counters of the workitems may also be used for selecting the next workitems to be scheduled. Yet other techniques, such as, but not limited to, maximum program counter, program counters determined based on tree search, and the like, may also be used. It may be desired that the same selection technique is used for at least the duration of an execution of a program in order to ensure convergence.

As illustrated, the find_minimum_runnable_pc( ) function accesses the stored program counter vector and finds the one or more minimum valued entries in that vector. As discussed above, the stored program counter vector may have as many program counter values as a SIMD vector has workitems. Further checks (not shown in FIG. 2) may be performed to ensure that the selected entries correspond to workitems that have not yet reached a convergence point. For example, in addition to finding the minimum program counter, a check may be performed that the selected minimum entry is for a workitem that has not yet reached the join( ) at line 10 of program part 102 discussed above. Another vector may be accessed to determine whether each workitem has reached a particular convergence point. The determination of whether a workitem is blocked at a convergence point may include checking whether the respective workitem is at a convergence point, and whether the conditions for that synchronization and/or convergence point is satisfied.

The reschedule( ) function determines the desired program counter value by calling the find_minimum_runnable_pc. It then determines and sets an execution mask that indicates to the system what workitems are currently runnable. After setting the mask, a jump to the desired program counter is implemented.

Figure 3:
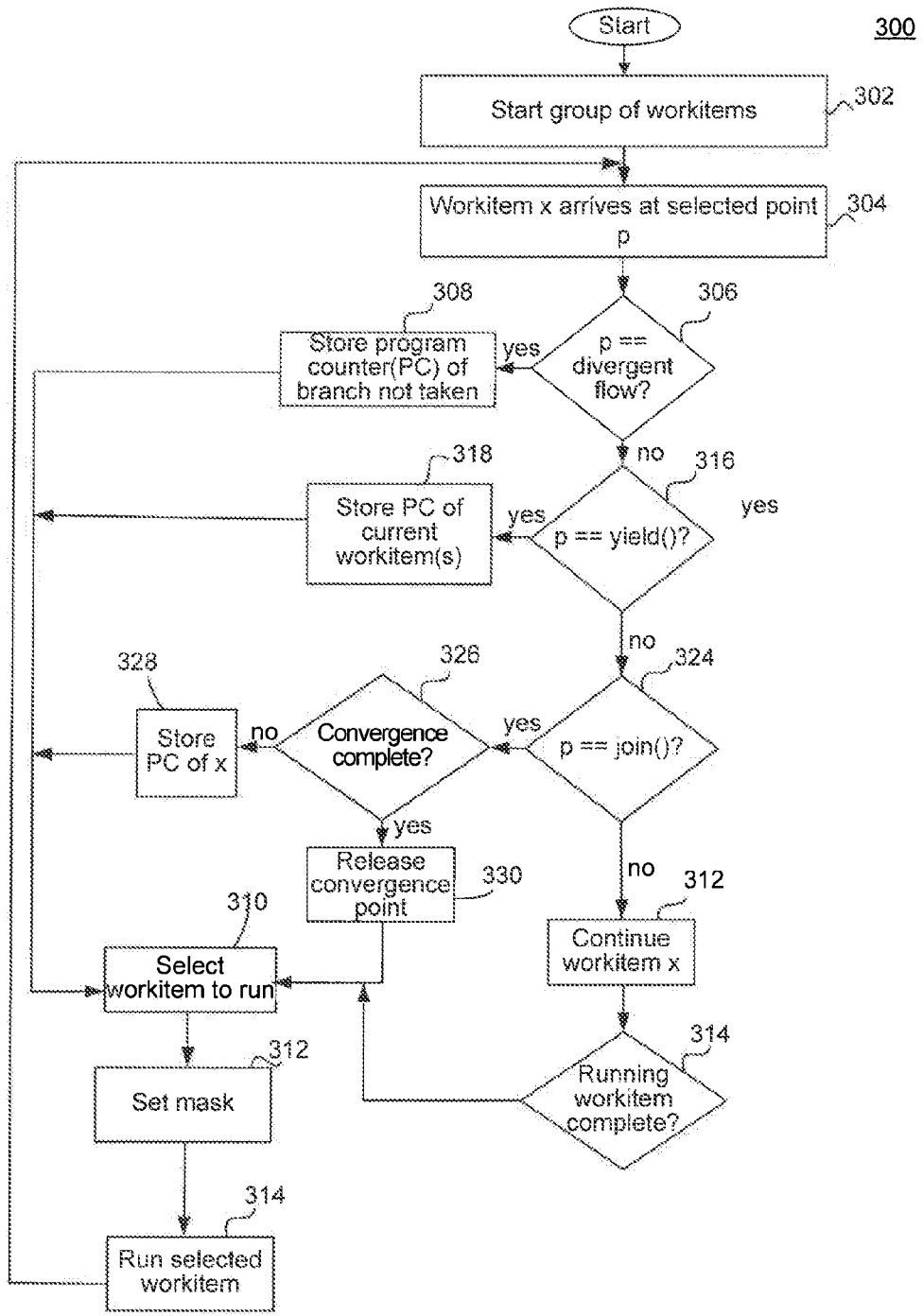
FIG. 3 illustrates a flowchart of a method for workitem synchronization, according to the embodiment.

FIG. 3 illustrates a flowchart of a method 300 for workitem synchronization, according to an embodiment. All of the stages 302-340 may not be needed, and stages 302-340 may be performed according to an ordering that is different from that illustrated in FIG. 3. Method 300 can be performed, for example, in a divergent flow synchronization module 409 which is described in relation to FIGS. 4 and 5 below. Method 300 enables workitem synchronization even when divergent control flows exist.

At stage 302, a group of workitems are started on a processor. The processor may include a vector processor, SIMD processor, or a combination of vector and scalar processors. According to an embodiment, the group of workitems corresponds to workitems associated with one SIMD vector that is executed on a processing element. The SIMD Vector can be, for example, implemented in an SPMD-on-SIMD implementation. Starting a group of workitems on the processor may include setting an execution mask, such as a bit vector or bitmask, indicating which of the workitems are currently runnable.

At stage 304, one of the workitems (e.g., workitem x) arrives at a selected point. A workitem may arrive at a selected point when the current instruction in the corresponding program may be one of a divergent control flow point, a synchronization point (e.g., yield( ) or convergence point (e.g., join). Method 300 causes workitem x to react differently for each type of selected point encountered.

At stage 306, it is determined Whether the point reached (p) is a divergent control flow point. Divergent control flow points include, but are not limited to, if/else conditionals, conditional loops (e.g., while loops, for loops), indirect function calls and the like that may cause sonic workitems to proceed in one instructions path and others to proceed in a different instruction path. For example, in FIG. 1, the "if (get_local_id(0)!=0)" instruction at line 3 of program part 102, is a divergent control flow point.

If p is a divergent control flow point, then at stage 308, the program counter for a branch not taken is stored in the stored program counter vector. For example, as shown in item 114 of FIG. 1, stored program counter vector is updated to "9 _ _ _" to indicate that workitem 0 is waiting and the next instruction to be executed by workitem 0 is instruction 9.

At stage 310 one or more workitems to be run are selected. The selection of the workitems to be run may be based upon the minimum program counter. The selection may be further based upon whether the particular workitems are enabled to run in accordance with the execution mask. The selection can, in addition, be based upon whether one or more workitems have already reached a convergence point.

Following stage 310, at stage 312, an execution mask is set to indicate that the workitems in the branch taken are runnable. As shown in item 120 in the first row, the mask is set to "0111" to indicate that all except workitem 0 is runnable upon executing instruction 3.

At step 314, the selected one or more workitems are run. Running of the workitems include execution of the instruction flow for that selected one or more workitems on the processor.

If, at step 306, it is determined that p is not a divergent control flow point, then, at stage 316 it is determined whether p is a synchronization point. As described above, a synchronization point may include, for example, a yield( ) instruction. If p is a synchronization point, then at stage 318 the program counters for the currently executing workitems are stored. According to an embodiment, the stored program counters represent the next instruction to be executed by the currently executing workitems. In the example shown in FIG. 1, upon executing the yield( ) instruction at line 6 of program part 102, the currently executing workitems 1-3 store the next instruction to be executed (e.g., instruction 4) to obtain a stored program counter vector as "9 4 4 4".

Following stage 318, at stage 310, one or more workitems are selected to be run. The selection, as described above, may be based on some characteristic of the stored program counter values. At stage 312, following stage 310, the execution mask is set to reflect the selected workitems. In the example of FIG. 1, based upon the stored program counters workitem 0 is selected to be run and the mask is set to "1000" to represent the selection. At stage 314, the selected workitem is executed on the processor.

If, at stage 316, it is determined that p is not a synchronization point, then at stage 324, it is determined whether p is a convergence point. As described above convergence points include, for example, a join( ) instruction. If p is a convergence point, then at stage 326 it is determined whether the conditions associated with the convergence point has been satisfied with the arrival of workitem x at p.

If convergence at p is not complete, then at stage 328 the program counter of workitem x is stored and workitem x waits upon the next instruction to be executed. After storing the program counter of the currently executing workitem(s), at stage 310 one or more workitems to be run are selected.

At stages 312 and 314, the mask is set appropriately, and the selected one or more workitems are executed.

If convergence at p is complete at stage 326, then at stage 330 the convergence point is released. Following the release of the convergence point, at stage 310 one or more workitems to run are selected, and at stages 312 and 314 the mask is set accordingly and the selected workitems are executed. When the convergence point has been satisfied, according to an embodiment, the mask may be set to make all workitems of the SIMD vector runnable. For example, in the example of FIG. 1, as shown in items 124 and 112, after the execution of instruction 10 (i.e., join( )), the mask may be set to "1111".

If, subsequent to any stages 306, 316, and 324, processing reaches stage 338, the execution of workitem x continues until x is done or another selected point is reached as determined by stage 340. If a selected point is reached, then processing of method 300 proceeds to stage 304. If x completes, then stage 310 is reached. Following stage 340, at stages 310, 312 and 314, one or more workitems to be run next are selected, the mask set accordingly, and the selected one or more workitems are run.

As noted above, the program counters may be stored in any type of memory or register, and may include a vector of program counters. Each workitem may have its own program counter. It is noted that, in the embodiments described in relation to method 300, the program counter for each workitem is tracked or stored only upon reaching a selected point (e.g., divergent control flow point, synchronization point, or convergence point). Tracking the respective program counters only at selected points reduce the cost associated with the tracking. However, other embodiments may include continuously or more frequently tracking the respective program counters.

Comparing the program counters may include processing a vector of program counters to determine one or more program counter values that satisfy a predetermined characteristic. According to an embodiment, the minimum of the program counter values are determined. The pseudo code illustrated in FIG. 2, for example, determines the workitems with the minimum valued program counters. In another embodiment, the mode of the program counter values may be determined. As noted above, other characteristics, such as, but not limited to, a maximum, a midpoint, and the like may be used.

Figure 4:
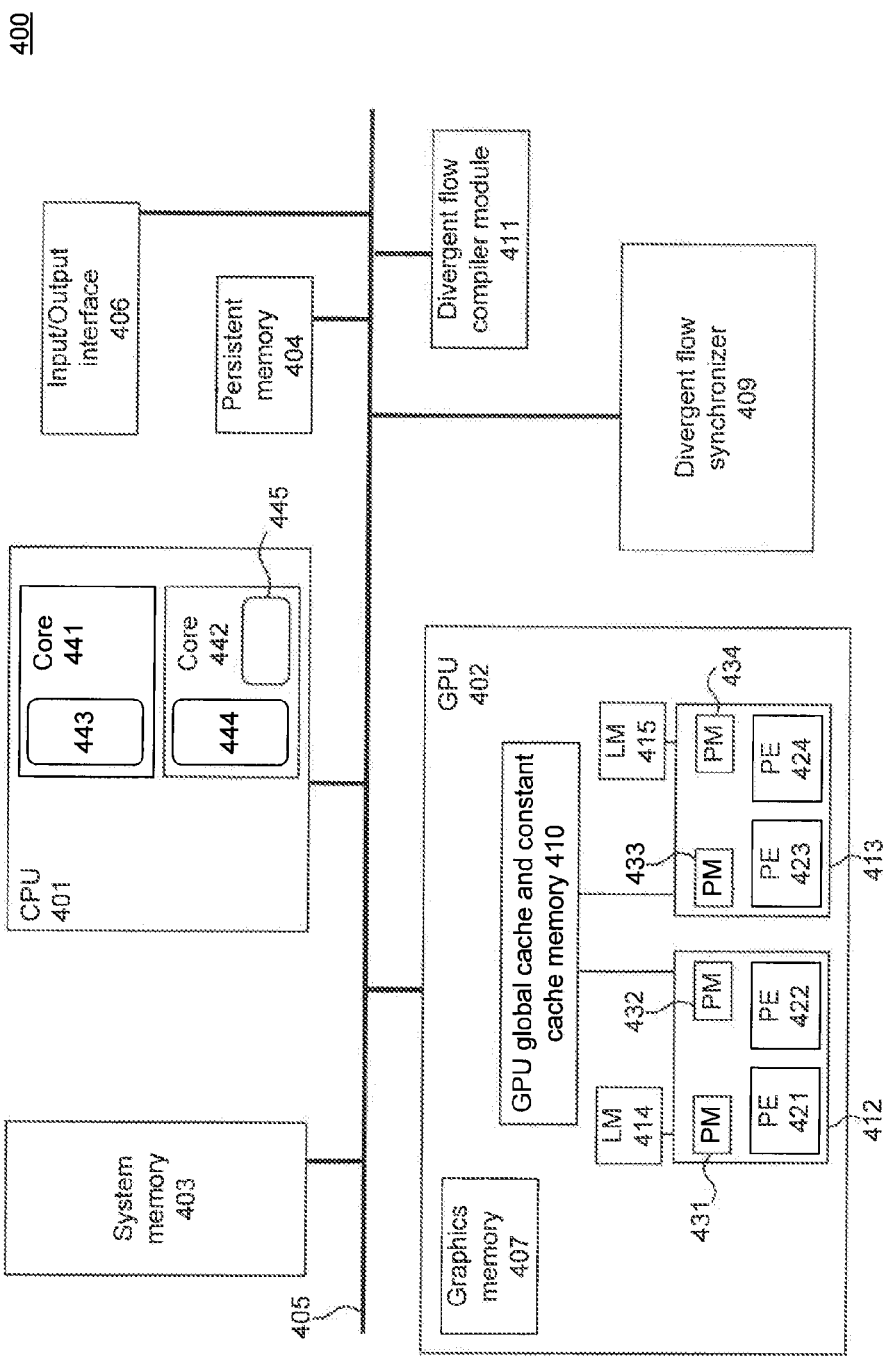
FIG. 4 illustrates a block diagram of a system for workitem synchronization, according to an embodiment.

FIG. 4 is a block diagram illustration of a system for workitem synchronization in accordance with an embodiment. In FIG. 4, an example heterogeneous computing system 400 can include one or more CPUs, such as CPU 401, and one or more GPUs, such as GPU 402. Heterogeneous computing system 400 can also include system memory 403, persistent storage device 404, system bus 405, an input/output device 406, a divergent flow compiler module 407 and a divergent flow synchronizer 409.

CPU 401 can include a commercially available control processor or a custom control processor. CPU 401, for example, executes the control logic that controls the operation of heterogeneous computing system 400. CPU 401 can be a multi-core CPU, such as a multi-core CPU with two CPU cores 441 and 442. CPU 401, in addition to any control circuitry, includes CPU cache memories 443 and 444 of CPU cores 441 and 442, respectively. CPU cache memories 443 and 444 can be used to temporarily store instructions and/or parameter values during the execution of an application on CPU cores 441 and 442, respectively.

For example, CPU cache memory 443 can be used to temporarily store one or more control logic instructions, values of variables, or values of constant parameters, from the system memory 403 during the execution of control logic instructions on CPU core 441. CPU 401 can also include specialized vector instruction processing units. For example, CPU core 442 can include a Streaming SIMD Extensions (SSE) unit that can efficiently process vectored instructions. A person skilled in the art will understand that CPU 401 can include more or less CPU cores than shown in the example, and can also have either no cache memories or more complex cache memory hierarchies.

GPU 402 can include a commercially available graphics processor or custom designed graphics processor. GPU 402, for example, can execute specialized code for selected functions. In general, GPU 402 can be used to execute graphics functions such as graphics pipeline computations and rendering of image on a display.

GPU 402 includes a GPU global cache memory 410 and one or more compute units 412 and 413. A graphics memory 404 can be included in, or coupled to, GPU 402. Each compute unit 412 and 413 is associated with a GPU local memory 414 and 415, respectively. Each compute unit includes one or more GPU processing elements (PE). For example, compute unit 412 includes GPU processing elements 421 and 422, and compute unit 413 includes GPU PEs 423 and 424.

Each GPU processing element 421, 422, 423, and 424 is associated with at least one private memory (PM) 431, 432, 433, and 434, respectively. Each GPU PE can include one or more of a scalar and vector floating-point units. The GPU PEs can also include special purpose units such as inverse-square root units and sine/cosine units. GPU global cache memory 410 can be coupled to a system memory such as system memory 403, and/or graphics memory such as graphics memory 407.

System memory 403 can include at least one non-persistent memory such as dynamic random access memory (DRAM). System memory 403 can store processing logic instructions, constant values and variable values during execution of portions of applications or other processing logic. For example, the control logic and/or other processing logic of divergent flow synchronizer 409 can reside within system memory 403 during execution of divergent flow synchronizer 409 by CPU 401. The term "processing logic," as used herein, refers to control flow instructions, instructions for performing computations, and instructions for associated access to resources.

Persistent memory 404 includes one or more storage devices capable of storing digital data such as magnetic disk, optical disk, or flash memory. Persistent memory 404 can, for example, store at least parts of instruction logic of divergent flow synchronizer 409. At the startup of heterogeneous computing system 400, the operating system and other application software can be loaded in to system memory 403 from persistent storage 404.

System bus 405 can include a Peripheral Component Interconnect (PCI) bus, Industry Standard Architecture (ISA) bus, or such a device. System bus 405 can also include a network such as a local area network (LAN), along with the functionality to couple components, including components of heterogeneous computing system 400.

Input/output interface 406 includes one or more interfaces connecting user input/output devices, such as keyboard, mouse, display and/or touch screen. For example, user input can be provided through a keyboard and mouse connected user interface 406 to heterogeneous computing system 400. The output of heterogeneous computing system 400 can be output to a display through user interface 406.

Graphics memory 407 is coupled to system bus 405 and to GPU 402. Graphics memory 407 is, in general, used to store data transferred from system memory 403 for fast access by the GPU. For example, the interface between GPU 402 and graphics memory 407 can be several times faster than the system bus interface 405.

Divergent flow synchronizer 409 includes logic to synchronize functions and processing logic on either GPU 402 or CPU 401. Divergent flow synchronizer 409 may be configured to synchronize workitems ire each individual processor and/or within each processing element of a processor.

Divergent flow compiler module 411 includes logic to enable the insertion of synchronization points and/or convergence points in instruction streams. According to an embodiment, divergent flow compiler module 411 may include synchronization points, such as, but not limited to, yield( ) instructions, discussed above in the instruction flow. The locations at which to insert the synchronization instructions may be determined based upon an analysis of the control flow to determine points of divergent control flow. The synchronization points are inserted so that, when the execution paths of respective workitems of a SIMD vector diverge, all diverging paths get a chance to run. Convergence points, such as, but not limited to, join( ) instructions may be inserted based upon the locations at which the synchronization instructions are placed. An example program part illustrating a synchronization instruction and convergence instruction in accordance with an embodiment is shown in FIG. 1.

Divergent flow synchronizer 409 is farther described in relation to FIG. 5 below. A person of skill in the art will understand that divergent flow synchronizer 409 and divergent flow compiler module 411 can be implemented using software, firmware, hardware, or any combination thereof. When implemented in software, for example, divergent flow synchronizer 409 and/or divergent flow compiler module 411 can be a computer program written in C or OpenCL, that when compiled and executing resides in system memory 403. In source code form and/or compiled executable form, divergent flow synchronizer 409 and/or divergent flow compiler module 411 can be stored in persistent memory 404. In one embodiment, some or all of the functionality of divergent flow synchronizer 409 and/or divergent flow compiler module 411 is specified in a hardware description language such as Verilog, RTL, netlists, to enable ultimately configuring a manufacturing process through the generation of maskworks/photomasks to generate a hardware device embodying aspects of the invention described herein.

A person of skill in the art will understand that heterogeneous computing system 400 can include more or less components that shown in FIG. 4. For example, heterogeneous computing system 400 can include one or more network interfaces, and or software applications such as the OpenCL framework.

Figure 5:
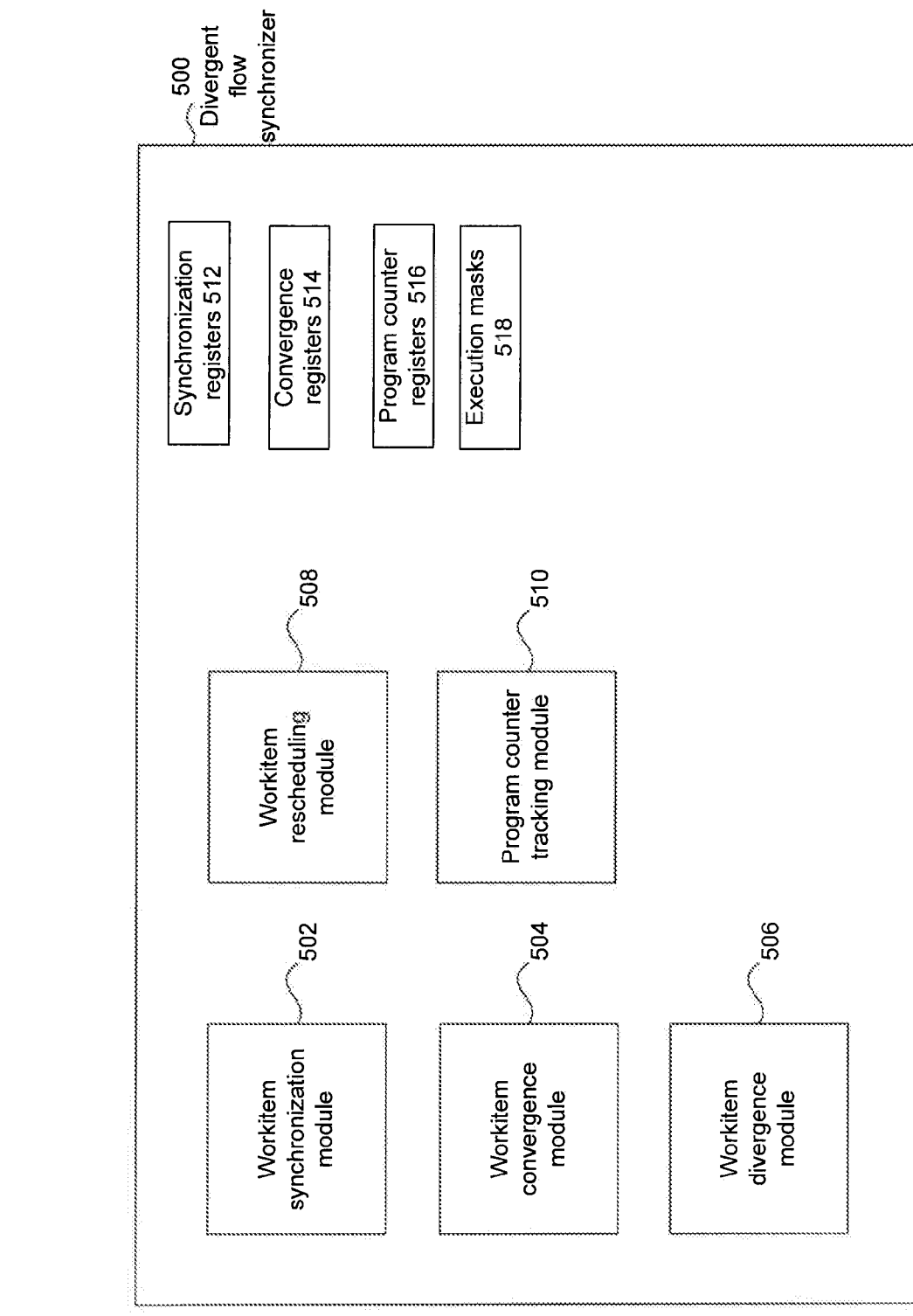
FIG. 5 illustrates a block diagram of a workitem synchronization module, according to an embodiment.

FIG. 5 is an illustration of divergent flow synchronizer 500, according to an embodiment. Divergent flow synchronizer 500 includes a workitem synchronization module 502, a workitem convergence module 504, a workitem divergence module 506, a workitem rescheduling module 508, and a program counter tracking module 510. Moreover, divergent flow synchronizer 500 can include synchronization registers 512, convergence registers 514, program counter registers 516, and execution masks 518. According to an embodiment, divergent flow synchronizer 500 is included in divergent flow synchronizer 409.

Workitem synchronization module 502 may operate to determine whether a particular instruction is a synchronization point and to implement the processing associated with a workitem reaching a synchronization point. According to an embodiment, workitem synchronization module 502 may include the logic associated with processing stages 316-318 and 310-312 described above in relation to method 300.

Workitem convergence module 504 may operate to determine whether a particular instruction is a convergence point and to implement the processing associated with a workitem reaching a convergence point. According to an embodiment, workitem convergence module 504 may include the logic associated with processing stages 324-328 and 310-314 described above in relation to method 300.

Workitem divergence module 506 may operate to determine whether a particular instruction is a divergent control flow point and to implement the processing associated with a workitem reaching a divergent control flow point. According to an embodiment, workitem divergence module 506 may include the logic associated with processing stages 306-314 described above in relation to method 300.

Workitem rescheduling module 508 operates to select workitems to be executed next and to enable them for execution. With the assistance of the program counter tracking module 510, workitem rescheduling module 508 may schedule a set of selected workitems to be execute next, and may initiate the execution. The selected set of workitems may have a program counter value that satisfy a predetermined criteria and may also be determined as not having already reached a convergence point. According to an embodiment, workitem rescheduling module 508 may include the logic associated with processing stages 310-312 described above in relation to method 300.

Program counter tracking module 510 operates to track and/or store program counter values associated with the respective workitems. Program counter tracking module 510 may also include some or all of the functionality to determine workitems that satisfy a predetermined set of characteristics in the stored program counter. As noted above, the program counters may be tracked only at selected points, such as, divergent control flow points, synchronization points and convergence points, or may be more frequently tracked. According to an embodiment, tracking of individual program counters for respective workitems of a SIMD vector is initiated upon the occurrence of a divergent control flow and continues until the respective flows continue on different paths. When there is no divergent control flow in the active execution path, one program counter may be maintained for all workitems of a SIMD vector in common. According to an embodiment, program counter tracking module 510 may assist in performing stages 308, 318 and 328.

Some embodiments may include one or more synchronization registers 512, convergence registers 514, program counter registers 516. Synchronization registers 512 may be one or more data structures formed in any type of memory and/or using hardware registers. Synchronization registers 512 maintain the status of each synchronization point. In some embodiments, synchronization registers 512 maintains the status of each workitem in relation to the synchronization point.

Convergence registers 514 may be one or more data structures formed in any type of memory and/or using hardware registers. Convergence registers 514 maintain the status of each convergence point. In some embodiments, convergence registers 514 maintains the status of each workitem in relation to the convergence point.

Program counter registers 516 may be one or more data structures formed in any type of memory and/or using hardware registers. Program counter registers 516 may be used for stored program counter vectors and stores the program counter values for the respective workitems and/or SIMD vectors. Example stored program counter vectors are shown in item 114 in FIG. 1.

Execution masks 518 may be one or more data structures formed in any type of memory and/or using hardware registers. Execution masks 518 may be utilized to indicate which of the workitems are currently runnable. Example execution masks are shown in items 120 and 122 in FIG. 1.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of synchronizing a group of workitems executing an instruction stream on a processor, the method comprising:
   determining a divergent control flow point associated with at least a first workitem;
   inserting a synchronization instruction following the determined divergent control flow point in the instruction stream;
   responsive to the synchronization instruction in the instruction stream, yielding the processor by the first workitem;
   updating a first one of a plurality of program counters to point to a next instruction following the synchronization instruction in the instruction stream to be executed by the first workitem; and
   running a second workitem on the processor after the yielding;
   wherein the updating of the first one of the plurality of program counters comprises storing a value corresponding to the next instruction in the first one of the plurality of program counters, wherein the first one of the plurality of program counters corresponds to a program counter of the first workitem.

2. The method of claim 1, wherein the storing comprises:
   storing the first one of the plurality of program counters upon encountering one or more of a divergent control flow point, synchronization point, or convergence point in the instruction stream.

3. The method of claim 1, wherein the inserting comprises:
   determining that the determined divergent control flow point causes at least a first and a second branch of instruction flow, wherein one or more workitems in the first branch of instruction flow wait for a value to be updated in the second branch of the instruction flow; and
   inserting the synchronization instruction in the first branch of instruction flow.

4. The method of claim 1, wherein the running the second workitem comprises:
   selecting the second workitem from the group of workitems by comparing a second one of the plurality of program counters to other ones of the plurality of program counters.

5. The method of claim 4, wherein the selecting comprises:
   comparing the second one of the plurality of program counters to one or more others of the plurality of program counters; and
   determining the second one of the plurality of program counters as having a predetermined characteristic relative to the one or more others of the plurality of program counters.

6. The method of claim 5, wherein the predetermined characteristic is a lowest value relative to the one or more others of the plurality of program counters.

7. The method of claim 5, wherein the predetermined characteristic is a mode value.

8. The method of claim 1, further comprising:
   initializing a memory portion for storing the plurality of program counters, wherein the initializing is responsive to an execution of a divergent control flow instruction in the instruction stream; and
   releasing the initialized memory portion in response to convergence of divergent control flow paths caused by the divergent control flow instruction.

9. The method of claim 1, wherein the group of workitems is executing in a processing element of a single instruction multiple data (SIMD) processing unit.

10. The method of claim 1, wherein the first and second workitems are configured as respective lanes of a SIMD vector.

11. A system, comprising:
   a processor which includes processing circuitry;
   a group of workitems executing an instruction stream on the processing circuitry;
   a divergent control flow compiler executing on the processing circuitry and configured to:
   determine a divergent control flow point associated with at least a first workitem; and
   insert a synchronization instruction following the determined divergent control flow point in the instruction stream; and
   a divergent flow synchronizer executing on the processing circuitry and configured to:
   responsive to the synchronization instruction in the instruction stream, yield the processor by the first workitem;

update a first one of a plurality of program counters to point to a next instruction following the synchronization instruction in the instruction stream to be executed by the first workitem; and run a second workitem on the processing circuitry after the yielding;

wherein the updating of the first one of the plurality of program counters comprises storing a value corresponding to the next instruction in the first one of the plurality of program counters, wherein the first one of the plurality of program counters corresponds to a program counter of the first workitem.

12. The system of claim 11, wherein the first and second workitems are configured as respective lanes of a SIMD vector being executed by the processor.

13. The system of claim 12, wherein the divergent flow synchronizer is further configured to:

select the second workitem from the group of workitems by comparing a second one of the plurality of program counters to other ones of the plurality of program counters.

14. The system of claim 13, wherein the divergent flow synchronizer is further configured to:

compare the second one of the plurality of program counters to one or more others of the plurality of program counters; and determine the second one of the plurality of program counters as having a predetermined characteristic relative to the one or more others of the plurality of program counters.

15. The system of claim 11, wherein the divergent control flow compiler is further configured to:

determine that the determined divergent control flow point causes at least a first and a second branch of instruction flow, wherein one or more workitems in the first branch of instruction flow wait for a value to be updated in the second branch of the instruction flow; and insert the synchronization instruction in the first branch of instruction flow.

16. A non-transitory computer readable storage medium having instructions encoded thereon, execution of which by processing circuitry of a processor cause execution of a method of synchronizing a group of workitems, the method including operations comprising:

determining a divergent control flow point associated with at least a first workitem;

inserting a synchronization instruction following the determined divergent control flow point in the instruction stream;

responsive to the synchronization instruction in the instruction stream, yielding the processor by the first workitem;

updating a first one of a plurality of program counters to point to a next instruction following the synchronization instruction in the instruction stream to be executed by the first workitem; and running a second workitem on the processor after the yielding;

wherein the updating of the first one of the plurality of program counters comprises storing a value corresponding to the next instruction in the first one of the plurality of program counters, wherein the first one of the plurality of program counters corresponds to a program counter of the first workitem.

17. The non-transitory computer readable storage medium of claim 16, wherein the updating the first one of the plurality of program counters comprises:

determining the next instruction in the instruction stream following the synchronization instruction.

* * * * *